United States Patent [19]
Shillington

[11] Patent Number: 4,919,086
[45] Date of Patent: Apr. 24, 1990

[54] INTEGRATED TUNED INDUCTION SYSTEM

[75] Inventor: Ronald G. Shillington, Dover Center, Canada

[73] Assignee: Siemens-Bendix Automotive Electronics Ltd., Chatham, Canada

[21] Appl. No.: 313,921

[22] Filed: Feb. 22, 1989

[51] Int. Cl.$^5$ .............................................. F02M 35/10
[52] U.S. Cl. ................................ 123/52 MC; 123/306
[58] Field of Search ......... 123/52 M, 52 MB, 52 MC, 123/52 MV, 308, 432, 306

[56] References Cited

U.S. PATENT DOCUMENTS

| | | | |
|---|---|---|---|
| 4,254,746 | 3/1981 | Chiba et al. | 123/52 M |
| 4,497,287 | 2/1985 | Schleiermacher et al. | 123/52 M |
| 4,516,538 | 5/1985 | Arakawa et al. | 123/52 M |
| 4,523,560 | 6/1985 | Motosugi et al. | 123/308 |
| 4,643,138 | 2/1987 | Ruf et al. | 123/52 MV |
| 4,664,075 | 5/1987 | Poulos | 123/52 M |
| 4,669,428 | 6/1987 | Ichida et al. | 123/52 MV |
| 4,719,879 | 1/1988 | Kato et al. | 128/52 M |
| 4,760,703 | 8/1988 | Minami et al. | 123/52 M |
| 4,776,313 | 10/1988 | Freismuth et al. | 123/52 M |
| 4,829,944 | 5/1989 | Sukimoto et al. | 123/52 M |

Primary Examiner—David A. Okonsky
Attorney, Agent, or Firm—George L. Boller; Russel C. Wells

[57] ABSTRACT

An integrated tuned air induction system for an internal combustion engine comprises an air intake leading to an air filter compartment. The air filter compartment leads to a tube that extends horizontally past a bank of cylinders that is served by the system. The tube leads to a tubular extension piece that creates a 180 degree turn. After this turn, the airflow passes through an air body containing a valve that controls the induction airflow. After the air body, the airflow passes to a plenum zone that lies parallel to the first tube. Spiral runners arranged transversely to the length of the plenum zone communicate the plenum zone to the intake of each cylinder in the bank. The first tube, the runners, and the plenum zone are formed by a single plastic part. The air filter compartment is defined by an end wall of this part and a removable cover. An integral wall of the part serves to mount the part on the engine while providing support for the runners. The air body has slip fit sealed joints via which it connects into the system.

15 Claims, 2 Drawing Sheets

INTEGRATED TUNED INDUCTION SYSTEM

BACKGROUND AND SUMMARY OF THE INVENTION

This invention relates generally to the air induction systems of internal combustion engines and more specifically it relates to an integrated tuned air induction system.

It is a known fact that performance of an internal combustion engine can be improved by tuning the air induction system. Such tuning involves the use of runners, or tubes, of particular lengths. In an automobile however, the packaging of tuned tubes, or runners, is a challenge to engineers and designers.

The present invention relates to a tuned air induction system in which various component parts are packaged into an integrated system. The present invention is well suited to enable a tuned air induction system to be implemented in an automobile with the objective of simplifying manufacturing and assembly procedures.

The foregoing features, advantages and benefits of the invention, along with additional ones, will be seen in the ensuing description and claims which should be considered in conjunction with the accompanying drawings. The drawings disclose a presently preferred embodiment of the invention according to the best mode contemplated at the present time in carrying out the invention.

DESCRIPTION OF THE PREFERRED EMBODIMENT

Figure 1:
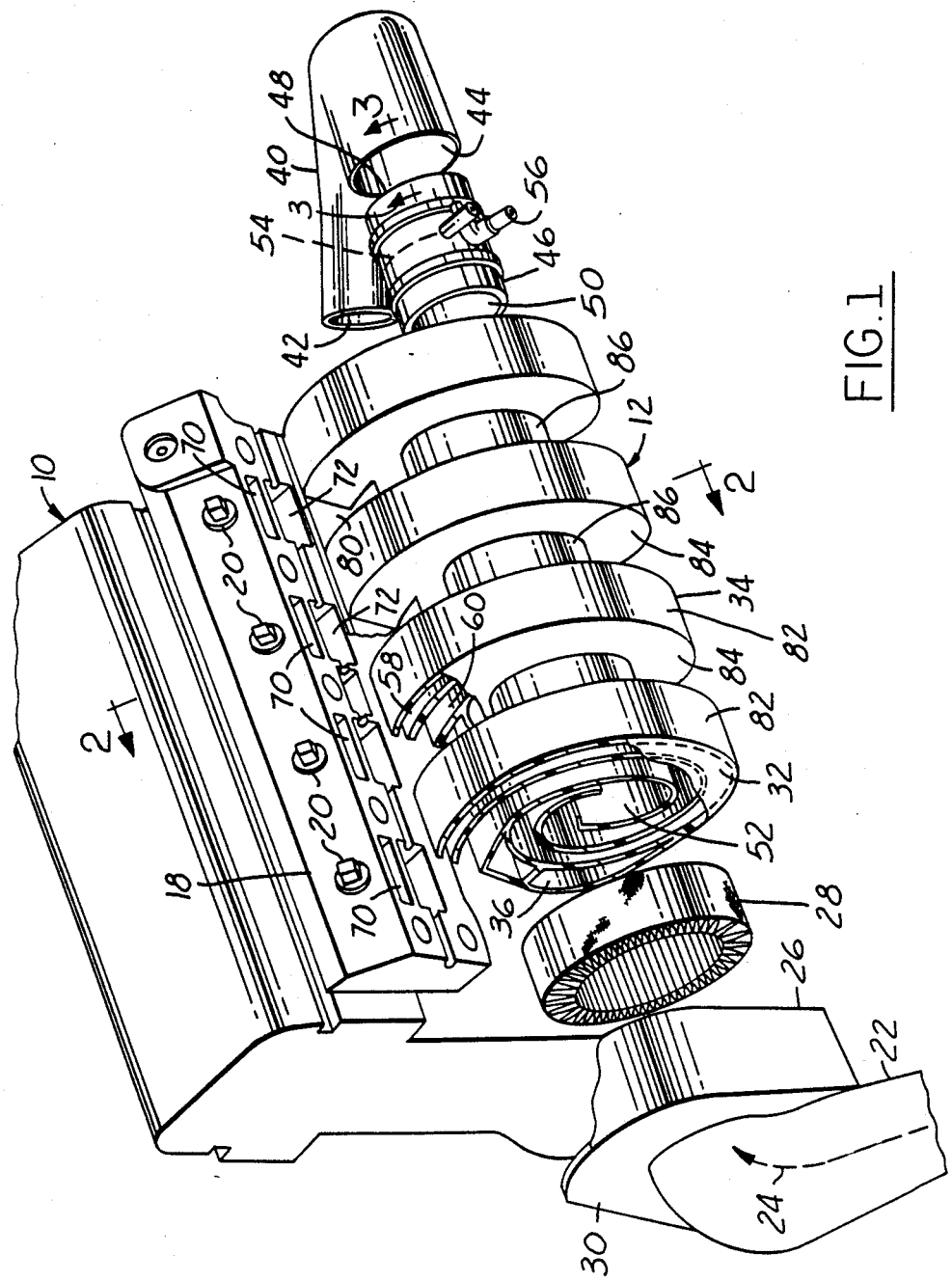
FIG. 1 is a perspective view, having portions exploded and broken away, illustrating an integrated tuned air induction system according to the present invention.
Figure 2:
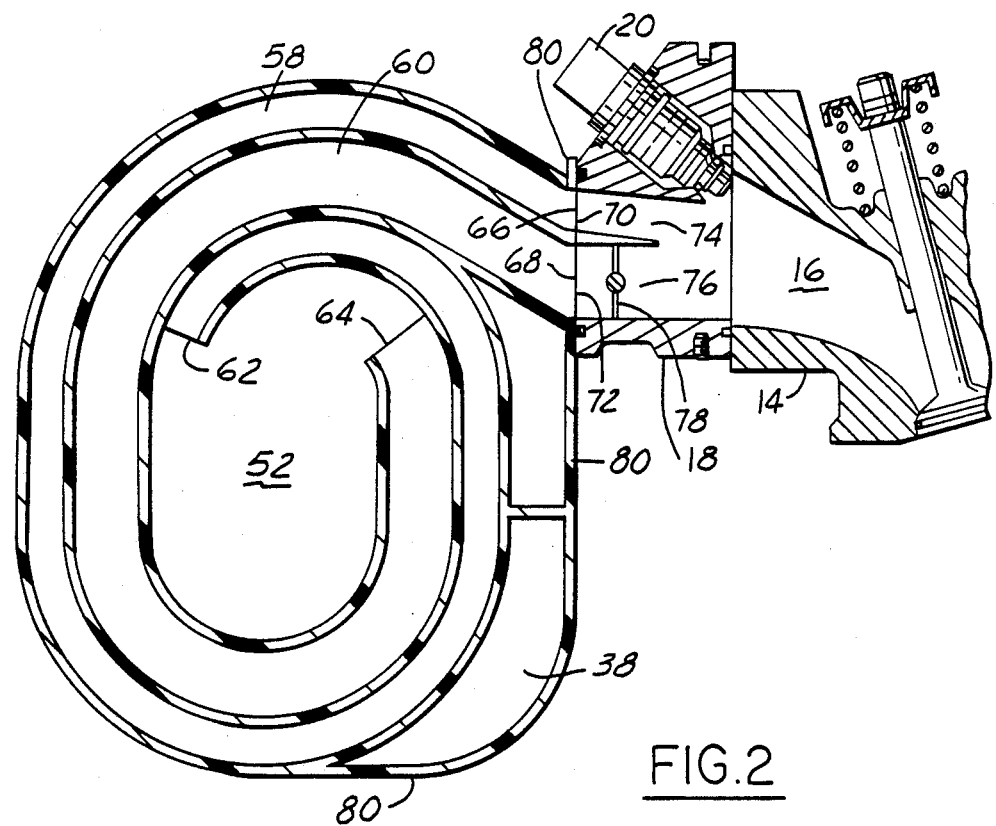
FIG. 2 is a transverse cross-sectional view on an enlarged scale illustrating the components in assembly and taken generally in the direction of arrows 2—2 in FIG. 1.

The drawings show by way of example a four cylinder internal combustion engine 10 with which is associated an integrated tuned air induction system 12. The engine has a cylinder head 14 containing an intake port 16 via which a combustible air-fuel mixture enters each engine cylinder. Air passes through system 12 and through air passages in a fuel rail block 18 that is fastened to cylinder head 14. The fuel rail block contains four electromagnetic fuel injectors 20, each of which is poised to spray fuel in suitably timed relation to the engine operation into each intake port 16 for mixture with air that has passed through system 12.

System 12 comprises an air intake 22 through which air enters an air filter compartment in the direction indicated by the arrow 24. The air filter compartment comprises a cover 26 that fits over an annular air filter element 28 to capture the air filter element between an annular end wall 30 of cover 26 and an imperforate end wall 32 of a main body part 34. The airflow passes radially outwardly through the air filter element 28 and enters the entrance end 36 of a tube 38 that forms a passage running parallel to engine 12 and passing the four cylinders that are served by the integrated tuned air induction system 12. Wall 32 is shown broken away in FIG. 1, and it is to be understood that this wall covers the end of body 34 except for the entrance end 36 of tube 38. Alternately, the air filter element could be a panel type element fitting diagonally within the compartment with the upper edge sealing against wall 32, the lower edge sealing against wall 30, and the side edges sealing against the sides of the cover.

The exit end of tube 38 cannot be directly seen in FIG. 1, but it is at the far end of main body 34. Tube 38 has a substantially constant cross-sectional area throughout its length and forms part of the tuning system. An extension piece 40 has an entrance end 42 that is fitted to the exit end of tube 38. Extension piece 40 provides a means to create approximately a 180° turn in the airflow after the flow has passed through tube 38. The outlet or exit end 44 of extension piece 40 has a circular shape and faces in a direction that is parallel to the direction in which the entrance end 42 faces. Extension piece 40 serves to maintain the cross-sectional area of tube 38 substantially constant so that the extension piece 40 also forms a part of the tuning system even though the shape of the cross-section changes.

Figure 3:
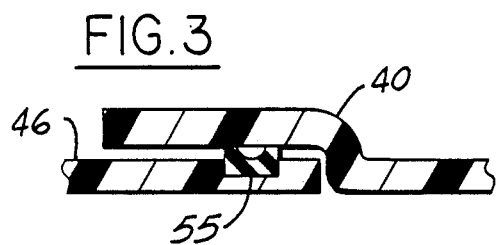
FIG. 3 is a fragmentary cross-sectional view on an enlarged scale taken in the direction of arrows 3—3 in FIG. 1.

A circular cylindrical air body 46 has an entrance end 48 that fits to the exit end 44 of extension piece 40, and it also has an outlet or exit end 50 that fits to the entrance end of a plenum zone 52. That entrance end of plenum zone 52 is at the far end of main body 34. The plenum zone 52 lies parallel to tube 38 and passes the four engine cylinders that are served by induction air system 12. Wall 32 closes the near end of the plenum zone. The air body 46 contains a butterfly 54 that is positioned by means of a lever 56 to control the airflow through air induction system 12. The exit end 44 of piece 40 has a circular shape that provides a slip fit with the entrance end of air body 46, and the entrance of plenum zone 52 also has a shape that provides a slip fit with the exit end of air body 46. The slip fit joint between air body 46 and extension piece 40 is shown in FIG. 3 and comprises a circular seal 55 that seals a radially facing surface of the air body with an opposite facing surface of the extension piece.

Main body 34 comprises four pairs of spiral runners that serve to communicate plenum zone 52 with corresponding cylinders of engine 10. Each pair of runners comprises a longer and narrower runner 58 and a shorter and wider runner 60. The shorter and wider runner is arranged in a nested fashion within the longer and narrower one so that they share a common wall. Each runner 58, 60 has a corresponding entrance 62, 64 that is in communication with plenum zone 52. The exit end 66, 68 of each runner 58, 60 in main body 34 is disposed at a corresponding entrance, 70, 72 respectively, in fuel rail block 18, and the fuel rail block has passages, 74 and 76 respectively, that constitute the terminations of the runners.

The runners 58 and 60 are also part of the tuning system. A wave deflector 78 is disposed in fuel rail block 18 at the termination of each runner 60. The wave deflectors are operated by an actuator (not shown) for opening and closing runners 60. In this way selective tuning of the air induction system may be accomplished.

A further feature of the main body 34 is that it includes a wall 80 that aids in the mounting and support of the main body from the engine. This wall 80 in general extends downwardly from the outer face of fuel rail block 18, forms the outer wall of tube 38 and extends outwardly around the bottom of the main body to provide a cradle-like support for the runners. Wall 80 has apertures for the exit ends of the runners 58, 60.

The main body 34, which comprises tube 36, plenum zone 52, runners 58, 60, and wall 80, may be fabricated as a one-piece plastic part by a suitable manufacturing technique, and by way of example, lost core molding may be one such suitable technique.

It will also be observed that the runners comprise outer walls 82 and side walls 84. Between the side walls 84 of adjacent pairs of runners the plenum zone 52 comprises an outer wall 86.

Features of the invention are the organization and arrangement of main body 34, the overall organization and arrangement of the air induction circuit, the organization and arrangement of the air filter compartment, the wall 80 that serves to support main body 34 on the side of the fuel rail block, and the slip fit sealed joints that connect the air body into the circuit.

While a preferred embodiment of the invention has been disclosed, it will be appreciated that principles are applicable to other embodiments.

What is claimed is:

1. An induction air circuit for a multi-cylinder internal combustion engine comprising an air intake leading to a first tube that runs parallel to the engine past a bank of cylinders that is served by the induction air circuit, a second tube that creates approximately a 180 degree turn in the induction airflow after the airflow has passed through the first tube, an air body that is located after the second tube and comprises a valve for controlling the airflow, a plenum zone that lies parallel to said first tube and is located after said air body, said plenum zone passing said bank of cylinders, and spiral runners that are arranged transversely to the length of said plenum zone, each runner extending from said plenum zone to a corresponding cylinder, wherein said runners, said plenum zone, and said first tube are a single plastic part, and said first tube and said plenum zone share respective wall portions of said runners as they pass said runners.

2. An induction air circuit as set forth in claim 1 wherein there are a pair of runners to each cylinder, each pair of runners sharing a common wall.

3. An induction air circuit as set forth in claim 2 wherein each pair of runners comprises its runners being in a nested relation.

4. An induction air circuit for a multi-cylinder internal combustion engine as set forth in claim 1 wherein the air flow to the engine is controlled by an air body having a positionable blade, and said air body having its entrance and its exit connected into the circuit by means of slip joints wherein there is a seal at each such slip joint that seals a radially facing surface of the air body with an opposite facing surface of the mating part.

5. A part of an induction air circuit of an internal combustion engine comprising a plurality of spiral runners spaced apart from each other, said runners having outlets leading to cylinders of the engine, and a wall that aids in supporting said runners on the engine, said wall comprising apertures through which the outlets of said runners pass to the engine, said wall providing a first point of support for said runners around said apertures, said wall extending downwardly from said apertures and into supporting relationship in contact with said runners at a second point of support for said runners that is spaced below the first point of support for said runners around said apertures.

6. A part for an induction air circuit of an internal combustion engine comprising a plurality of spiral runners spaced apart from each other, said runners having outlets leading to cylinders of the engine, and a wall that aids in supporting said runners on the engine, said wall comprising apertures through which the outlets of said runners pass to the engine, said wall extending downwardly from said apertures and into supporting relationship with said runners at a location below said apertures, including a tube whose length is generally transverse to said runners, a portion of said wall that lies below said apertures forming a portion of the wall of said tube.

7. An integrated unitary part for an induction air intake system for an internal combustion engine comprising a plurality of spiral runners spaced apart and bounding a central plenum region, wall portions extending between adjacent spiral runners to laterally enclose said plenum region, and a tube that extends parallel to said central plenum region and across said runners on the exterior of said runners, and wherein said runners, said wall portions, and said tube are a single plastic part, said tube sharing wall portions of said runners as it passes said runners.

8. In an induction air system for a multi-cylinder internal combustion engine, said induction air system comprising a main body having a plenum zone and runners leading from the plenum zone to the intakes of the engine cylinders, said induction system also comprising an air filter compartment containing an air filter element that is upstream of the plenum zone, the improvement which comprises the air filter compartment being cooperatively defined by a wall portion of said main body and a removable cover, wherein said wall portion includes an imperforate end wall of said main body coacting with said cover to capture said air filter element within said compartment, and adjacent said imperforate end wall of said main body there is the entrance to a tube that extends to communicate with said plenum zone at an end thereof which lies opposite said imperforate end wall, and wherein said removable cover removably encloses said air filter element and said entrance to said tube, said air filter element being constructed and arranged within said compartment to filter air entering said compartment before the air reaches said entrance to said tube.

9. The improvement set forth in claim 8 wherein the air filter element is annular in shape and the air filter compartment is constructed and arranged to cause the airflow to be directed radially outwardly through the air filter element.

10. An integrated unitary part for an induction air intake system for an internal combustion engine comprising a plurality of pairs of spiral runners, each pair of spiral runners having its runners arranged in nested relation, said pairs of spiral runners being spaced apart lengthwise of the part and bounding a central plenum region, wall portions extending between adjacent pairs of spiral runners to laterally enclose said plenum region, and a tube that extends parallel to said central plenum region and across said pairs of runners on the exterior of one of said runners of each pair, and wherein said runners, said wall portions, and said tube are a single plastic part, and wherein said tube and said one runner of each pair share a common wall portion as said tube passes each pair of runners.

11. In an induction air circuit for a multi-cylinder internal combustion engine the combination comprising a plenum zone that is supplied with air from an air intake, and spiral runners leading from said plenum zone and through which air is supplied from said plenum zone to individually engine cylinders, said runners being arranged in pairs laterally bounding said plenum zone, each pair having its runners arranged in a nested relation, and said pairs being spaced apart along the length of said plenum zone.

12. The combination set forth in claim 11 wherein said plenum zone and said runners are in a single plastic part.

13. The combination set forth in claim 11 wherein an air filter compartment is disposed at one lengthwise end of said plenum zone that is closed, and a tube extends from said compartment lengthwise of said plenum zone to communicate said compartment to said plenum zone at one open end thereof which is at the lengthwise opposite end of said plenum zone from the end at which said compartment is disposed.

14. The combination set forth in claim 11 including a supporting wall comprising apertures through which said runners pass to communicate to the engine cylinders, said supporting wall providing support of said pairs of runners around said apertures, and said supporting wall also extending into supporting relation in contact with said pairs of runners at locations that are spaced from the locations around said apertures at which said supporting wall provides support of said pairs of runners.

15. The combination set forth in claim 14 including a tube that extends lengthwise of said plenum zone and is disposed exterior to said plenum zone, said tube forming a portion of the flow path for induction air to said plenum zone, and wherein a portion of said supporting wall and a portion of said tube share a common wall portion.

* * * * *